March 14, 1961 H. E. WHIDDEN 2,974,633
PORTABLE STOCK FEEDER
Filed April 9, 1959
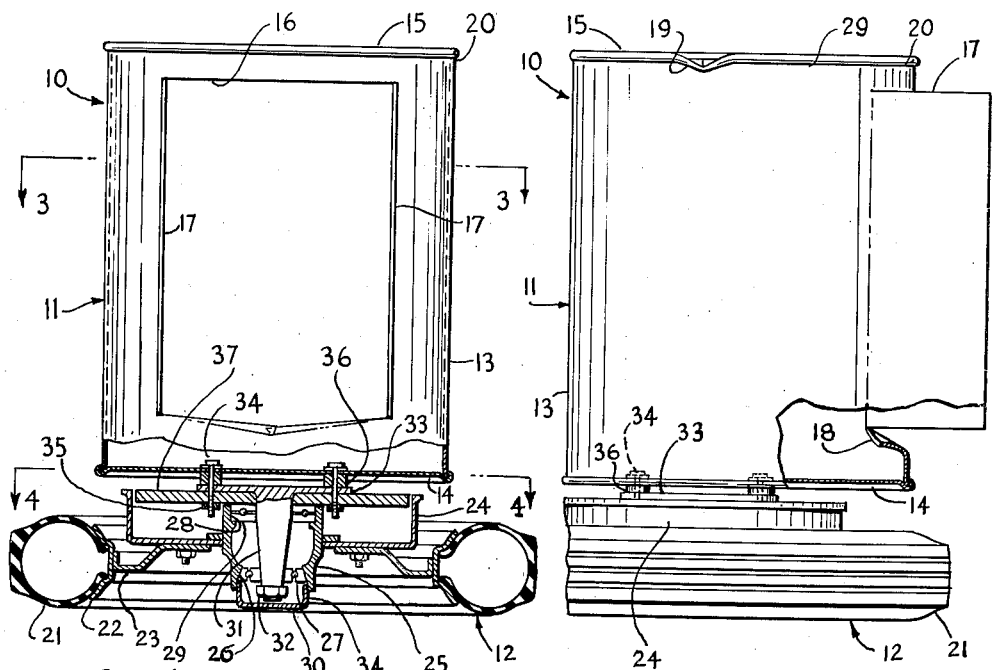
Fig. 1    Fig. 2
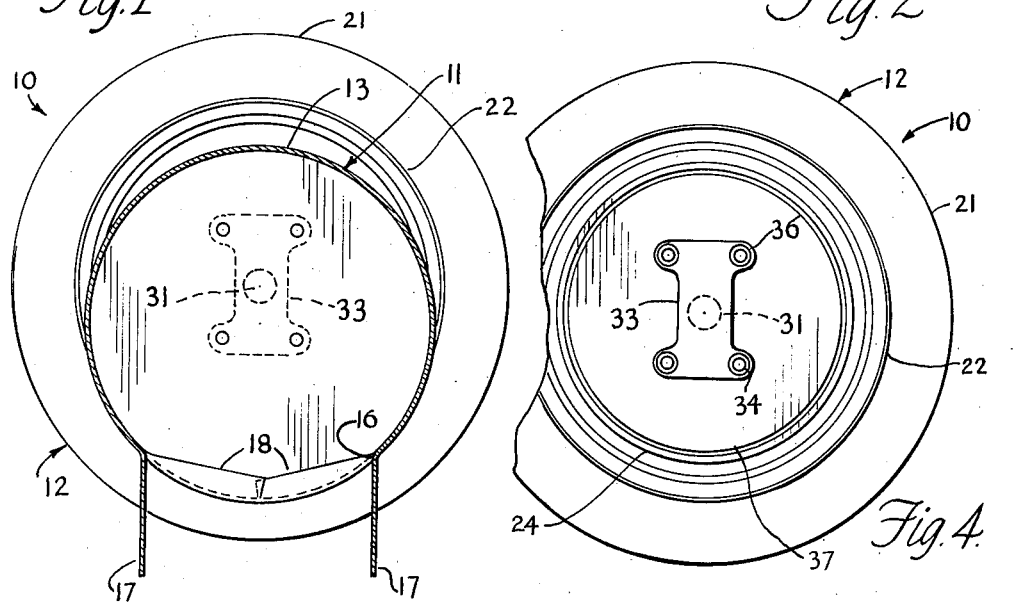
Fig. 3
Fig. 4
INVENTOR.
Howell Edison Whidden
BY
Owen & Owen
ATTORNEYS +# United States Patent Office 2,974,633
Patented Mar. 14, 1961

2,974,633

PORTABLE STOCK FEEDER

Howell Edison Whidden, 504 S. 58th St., Tampa 5, Fla.

Filed Apr. 9, 1959, Ser. No. 805,261

1 Claim. (Cl. 119—51)

This invention relates to portable stock feeders and more particularly to portable cattle feeders which protect feed from the weather by rotating with the wind to maintain an access opening on the leeward side of the feeder.

Various types of outdoor feeders for stock or poultry are well known in the art. Most of these feeders are rotatably mounted on a post or other footing permanently affixed in the ground and have an opening in a side wall thereof to enable the stoock or poultry to gain access to the feed therein. Vanes are mounted on top of the feeders to rotate them to a position such that the opening is away from the wind, thereby preventing rain, snow, sleet, etc. from contacting the feed. In this manner, the feed is maintained in a dry condition, protected from the elements.

The present invention provides an improved portable stock feeder with its own base which is separate from the ground on which the feeder rests, so that it can be transported from one field to another or to and from storage. The new feeder includes a drum, which preferably is a conventional 55 gallon type, with a spindle mounted eccentrically on the bottom thereof and rotatably held by a base, which can be a discarded automobile wheel. Because of the eccentricity of the spindle mounting, about which the feeder pivots, a larger portion of the feeder drum is on one side of the spindle than on the other, and the larger portion is presented to the wind, with the result that the wind produces a greater force on the larger portion of the drum and causes it to swing around the spindle until the larger portion is on the leeward side of the spindle. An opening is provided in the side wall of the larger portion of the drum, so that the opening is always on the lee side of the feeder when a wind is blowing. Thus, the feed within the drum is always maintained in a dry condition, and it is unnecessary to employ separate vanes to achieve this.

If desired, vanes can be provided for the drum in a very simple manner. Two horizontal slits and a vertical slit therebetween, generally in the shape of an I, or of two C's back-to-back, can be cut in that portion of the side wall of the drum in which the access opening is to be made. The portions of the wall adjacent the vertical slit and between the horizontal ones can then be struck or bent outwardly from the wall to produce an opening therein. These bent-out sections of the wall can be left in outwardly protruding positions to provide vanes which can aid the rotation of the drum so that the opening will be on the lee side of the drum when wind is blowing. This technique in making the opening and vanes enables both to be produced simultaneously without the necessity of riveting or welding separate vanes onto the feeder as previously has been done in the art. Further, no additional material is needed to make the vanes and no separate cutting, shaping, or welding or riveting step is necessary.

It is, therefore, a principal object of the invention to provide an improved portable stock feeder with improved means for maintaining an access opening therein on the leeward side of the feeder.

Another object of the invention is to provide a stock feeder in which a feed container or drum is eccentrically mounted on a base, in a manner to maintain an access opening in the drum on the leeward side thereof.

A further object of the invention is to provide an improved stock feeder having a feed containing drum for which an access opening and vanes are produced in a single operation.

Still another object of the invention is to provide an improved stock feeder made of commonly known and readily available parts.

Other objects and advantages of the invention will be apparent from the following detailed description of a preferred embodiment thereof, reference being made to the accompanying drawing, in which:

Fig. 1 is a front, elevational view of a feeder according to the invention with parts broken away and with the remaining parts shown in cross section;

Fig. 2 is a side elevational view of the feeder with a lower corner of a drum of the feeder broken away to show details of construction;

Fig. 3 is a view in horizontal cross section along the line 3—3 of Fig. 1; and

Fig. 4 is a fragmentary view in horizontal cross section taken along the line 4—4 of Fig. 1.

Referring to the drawing, a portable stock feeder according to the invention is indicated generally at 10 and includes a cylindrical feeder drum 11, which is eccentrically mounted for rotation on a base 12 that can be a discarded motor vehicle wheel. The drum 11 is preferably a conventional 55 gallon drum commonly used for oil and other liquids, and includes a side wall 13, a circular bottom wall 14, and a circular top wall 15. An access opening 16 in the side wall 13 can be formed by two horizontal, spaced slits, which establish the upper and lower limits of the opening 16, and a central, vertical slit connecting the other two to form an I design or two C's back-to-back. The sections of the side wall 13 between the horizontal slits and adjacent the vertical slit are then bent or struck outwardly from the periphery of the drum 11 to establish two vanes 17, each having a length equal to the height of the opening 16 and a width equal to half the width of the opening 16. The vanes 17 aid in rotating the drum 11 so that the opening 16 will be on the leeward side thereof and they also aid in preventing rain, etc. from entering the opening 16 and wetting feed within the drum 11.

If desired, a single vane similar to the vanes 17 can be made by slitting the wall in a C design and bending out that section of the wall 13 within the C. It will thus be seen that the opening 16 and the vanes 17 are produced in a single operation and that no additional work is required to produce the vanes and affix them to the drum as is the known practice in the art.

A lip 18 is formed at the lower edge of the opening 16 by making a short slit in the lower edge of the opening 16 and bending inwardly portions on each side of the slit. The lip prevents injury to animals such as cattle when they extend their heads through the opening 16 to consume the feed in the drum 11.

An indentation or groove 19 can be formed in a seam 20 of the drum 11, at the junction of the side wall 13 and the top wall 15 to drain rain water or melted snow accumulated on the top 15.

The base 12 is preferably a discarded automobile wheel which provides sufficient weight and area to support the drum 11 stably. The base or wheel 12 includes a tire 21 which increases the size and stability of the base and which is mounted on a rim 22 attached to a flange 23. A brake drum 24 is welded or bolted to the upper side of the flange 23 and a hub 25 extends through both the flange 23 and the brake drum 24 and is centrally mounted with respect to the base 12. The hub 25 includes a lower annular seat 26 which locates and supports a ball bearing 27. The hub 25 also has an upper annular seat 28 which locates and supports a thrust bearing 29. A cap 30 closes off the lower end of the hub 25 to keep dirt and water from the bearings 27 and 29 and to hold lubricating grease therefor.

A spindle 31 is received within the hub 25 and is mounted for rotation in the bearings 27 and 29. The lower end of the spindle 31 is threaded to receive a nut 32 which prevents removal of the spindle 31 from the hub 25. The spindle 31 is integral with a spindle plate 33 which is eccentrically affixed to the bottom wall 14 of the drum 11 by bolts 34 and nuts 35 with spacers 36 between the plate 33 and the bottom 14. The spacers 36 can be pipe couplings or short pipe sections which encompass the bolts 34 and maintain the bottom wall 14 in spaced relationship with respect to the spindle plate 33. This keeps the feeder drum 11 above the brake drum 24 of the base 12 and prevents rubbing during rotation. Below the spindle plate 33 is a cover plate 37 which is held against the spindle plate 33 by the bolts 34 and the nuts 35 and substantially closes off the brake drum 24 and the hub 25 to prevent dirt and water from injuring the bearings 26 and 28.

Brake shoes and lining can be left in the brake drum 24 so that the brake shoes can be pushed outwardly against the brake drum 24 to prevent rotation of the drum 11 with respect to the base 12 when the feeder 10 is transported.

The eccentric mounting of the spindle 31 on the drum bottom wall 14 is on the side of the center opposite the opening 16. As a consequence, any wind blowing in a direction other than along a line extending from the axis of the spindle 31 to the center of the circular drum bottom 14 will rotate the drum 11 until such line and the wind direction are aligned. This happens because, by virtue of the eccentric mounting, there is a greater area presented to the wind by the drum on one side of the spindle 31 than on the other. Consequently, the force differential rotates the drum 11 until the differential disappears, which can only occur when there is alignment, as indicated, at which time the opening 16 is on the lee side of the drum 11 and rain and snow cannot blow thereinto. This rotation of the drum 11 will occur whether or not the vanes 17 are employed, although the vanes 17 will render the rotation of the drum 11 somewhat more sensitive to the wind. It is to be understood that the same motion of the drum 11 will result whether the spindle 17 is mounted for rotation with respect to the base 12, as shown, or with respect to the bottom wall 14. However, the spindle 31 must be mounted eccentrically with respect to the bottom wall 14, whether or not mounted rotatably with respect thereto, for the drum 11 to rotate with the wind.

It will be seen that the invention basically comprises a feed containing drum having an opening in a side wall thereof and a spindle mounted eccentrically on the bottom thereof, to the side of the center of the bottom opposite the opening. The spindle is received by a horizontal base and is rotatable relative to the base, to the bottom wall of the drum, or to both. The side wall of the drum adjacent the opening can be provided with an integral vertically disposed vane running the length of the opening.

Modifications of the above-described single embodiment of the invention will be apparent to the reader and can be made without departing from the scope of the appended claim.

I claim:

A portable stock feeder for quadruped animals comprising a cylindrical drum having a circular bottom wall, a side wall, and an opening in the side wall, two parallel vanes integral with said side wall, and extending outwardly from each vertical edge of said opening, each of said vanes extending the height of said opening and having a width equal to half the width of the opening, a spindle, means mounting said spindle eccentrically on said circular bottom wall, on the side of the center of said bottom wall opposite the opening, a circular base adapted to rest on the ground and be separable therefrom, means mounting said spindle concentrically on said base, and means operatively associated with said spindle enabling rotation of said drum with respect to said base.

References Cited in the file of this patent
UNITED STATES PATENTS

| | | |
|---|---|---|
| 1,333,775 | Picotte | Mar. 16, 1920 |
| 2,691,361 | McAnly | Oct. 12, 1954 |
| 2,789,532 | Hoebing | Apr. 23, 1957 |